(No Model.)
C. J. SEYMOUR.
BICYCLE.
No. 566,027. Patented Aug. 18, 1896.
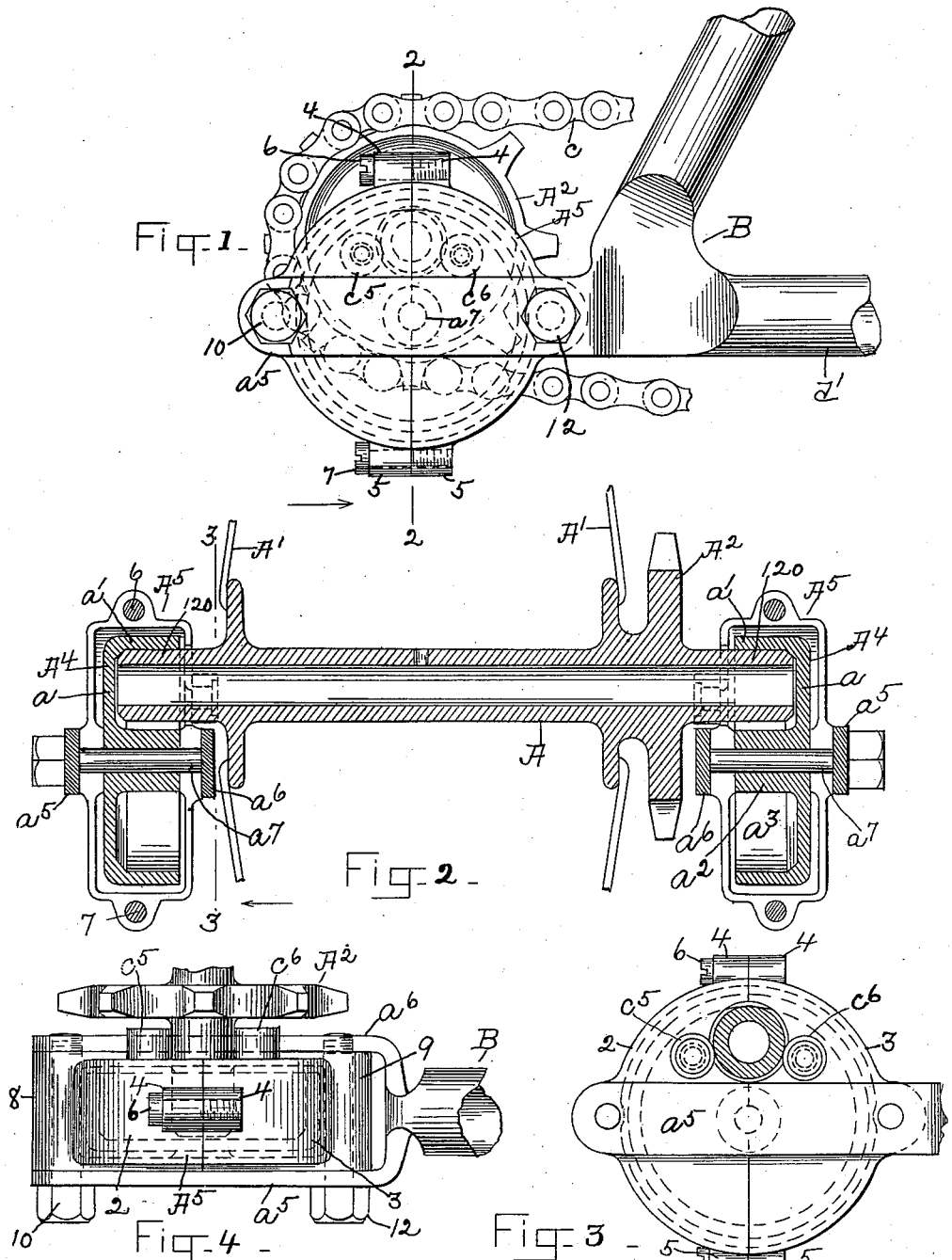

UNITED STATES PATENT OFFICE.

CHARLES J. SEYMOUR, OF BROOKLINE, MASSACHUSETTS, ASSIGNOR OF ONE-THIRD TO WILLIAM W. CARTER, OF BOSTON, MASSACHUSETTS.

BICYCLE.

SPECIFICATION forming part of Letters Patent No. 566,027, dated August 18, 1896.

Application filed August 1, 1895. Serial No. 557,811. (No model.)

*To all whom it may concern:*

Be it known that I, CHARLES J. SEYMOUR, of Brookline, county of Norfolk, and State of Massachusetts, have invented an Improvement in Bicycles, of which the following description, in connection with the accompanying drawings, is a specification, like letters on the drawings representing like parts.

This invention relates to bicycles, tricycles, and like polycycle machines, and has for its object to provide a machine in which the friction is reduced to a minimum.

The invention consists in a novel antifriction-bearing, as will be described, for the axle of the wheels.

Figure 1 is a side elevation of a sufficient portion of a bicycle to enable this invention to be understood; Fig. 2, a longitudinal section on the line 2 2, Fig. 1; Fig. 3, a transverse section on the line 3 3, Fig. 2, looking toward the left; and Fig. 4, a detail in plan to be referred to.

In the present instance I have chosen to illustrate the first feature of this improvement in bicycles and like polycycle machines in connection with what is commonly termed the "rear" wheel of the bicycle.

Referring to Figs. 1 to 4, inclusive, A represents the axle of the rear wheel of the bicycle, A' the the spokes thereof, and $A^2$ the sprocket-wheel fast thereon.

In accordance with the first feature of my invention the axle A supports at its opposite ends antifriction hollow wheels $A^4$, which may be formed as herein shown, each consisting of a disk or plate $a$, having extended from it an annular rim $a'$ and a hub $a^2$, forming with the said rim an annular passage $a^3$, into which the end of the axle A projects and upon the upper surface of which the hollow wheel rests.

The hollow wheels $A^4$, at the opposite ends of the axle A, support the frame B of the bicycle, which frame may be of any usual or suitable construction, except that in the present instance the said frame is provided with a yoke or fork for each hollow wheel, the said yoke or fork comprising outer and inner arms $a^5 a^6$, (see Figs. 2 and 4,) supporting the shaft or arbor $a^7$ for the hollow wheel, which may be loose on its shaft $a^7$ and the latter rigidly secured in the arms $a^5 a^6$, or the said hollow wheel may be fast on its shaft or arbor and the latter loosely journaled in the arms $a^5 a^6$. The arms $a^5 a^6$ of the yoke also support between them an inclosing case, box, or housing $A^5$ for the loose hollow wheel $A^4$, preferably made in two parts or halves 2 3, suitably secured together, and each part herein shown is provided with lugs or ears 4 5, adapted to receive fastening-screws 6 7. The parts or halves 2 3 of the casing or box are provided, as shown, with lugs or bosses 8 9, having holes through them for the passage of supporting-screws, bolts, or threaded rods 10 12, extended through suitable holes in the arms $a^5 a^6$ of the yoke.

The box or casing $A^5$ is closed at its sides, and its inner side is provided with an opening through which is extended the end or journal 120 of the shaft or axle A.

In operation the weight of the rider and of the frame of the machine is supported by the loose hollow wheels, which in turn are supported by or hung from the journals 120 of the axle A, and as the sprocket-wheel $A^2$ is rotated in the usual manner by means of the link-chain $c$, passed about the sprocket-wheel $A^2$, and a driving sprocket-wheel $c'$ on the pedal-shaft $c^2$ of the machine, (see Fig. 5,) the hollow wheels $A^4$ are turned by a rolling contact with a minimum amount of friction.

In order to keep the axle A in its proper working position with relation to the loose wheels $A^4$ and avoid the said axle and its wheel from getting out of alinement, devices are provided on opposite sides of the axle, which form guides between which the said axle extends and which prevent twisting or turning of the axle and its wheel or wheels connected therewith. In order to reduce friction upon the axle, these devices are preferably made as two pairs of antifriction-rolls $c^5 c^6$, preferably located near the opposite ends of the axle, and for convenience rotatably secured to the inner side of the housings or boxes $A^5$.

The antifriction-rolls $c^5 c^6$ have a rolling contact with the shaft or axle on substantially diametrically opposite sides of the same.

I claim—

In a velocipede, the combination of the following instrumentalities, viz: a wheel-axle, the velocipede-frame provided with forks or arms, hollow wheels mounted upon shafts supported by the said forks or arms and into which the ends of the axle are extended to make contact with the rim of the said hollow wheels and support the same and the said frame, an inclosing casing or box for each hollow wheel detachably secured to and supported between the said forks or arms and into which the wheel-axle extends, antifriction-guides carried by the casing and located on opposite sides of the wheel-axle, and means to detachably secure the said casing or box to the said forks or arms, substantially as described.

In testimony whereof I have signed my name to this specification in the presence of two subscribing witnesses.

CHARLES J. SEYMOUR.

Witnesses:
JAS. H. CHURCHILL,
J. MURPHY.